United States Patent [19]
Thomas

[11] Patent Number: 5,890,623
[45] Date of Patent: Apr. 6, 1999

[54] PLANT AND PROCESS FOR THE DISTRIBUTION OF A FLUID PRODUCT, COMPRISING A TANK AND A NOZZLE

[75] Inventor: Dominique Thomas, Le-Creusot, France

[73] Assignee: Seva, Chaton-Sur-Saone, France

[21] Appl. No.: 666,277

[22] PCT Filed: Dec. 15, 1994

[86] PCT No.: PCT/FR94/01468

§ 371 Date: Aug. 9, 1996

§ 102(e) Date: Aug. 9, 1996

[87] PCT Pub. No.: WO95/17289

PCT Pub. Date: Jun. 29, 1995

[30] Foreign Application Priority Data

Dec. 21, 1993 [FR] France .................................. 93 15670

[51] Int. Cl.⁶ .................................................... B67B 7/00
[52] U.S. Cl. .................................. 222/1; 222/55; 222/63; 222/257

[58] Field of Search ................................. 222/52, 55, 63, 222/257, 256, 319, 386, 1

[56] References Cited

U.S. PATENT DOCUMENTS

3,873,258  3/1975  Ratliff.
4,144,986  3/1979  Smith et al..
4,535,919  8/1985  Jameson.
4,613,059  9/1986  Merkel.

*Primary Examiner*—Gregory L. Huson
*Attorney, Agent, or Firm*—Sughrue, Mion, Zinn, Macpeak & Seas, PLLC

[57] ABSTRACT

The present invention relates to a plant and a process for the dispensing of a fluid product (4) held in a tank (3) and supplied to a nozzle (1) via a pipe (2). The product is pressurized by means of a pump (8) and of a cylinder (7) which is connected to a regulator (10) connected to the nozzle via an electronic card (17).

8 Claims, 1 Drawing Sheet

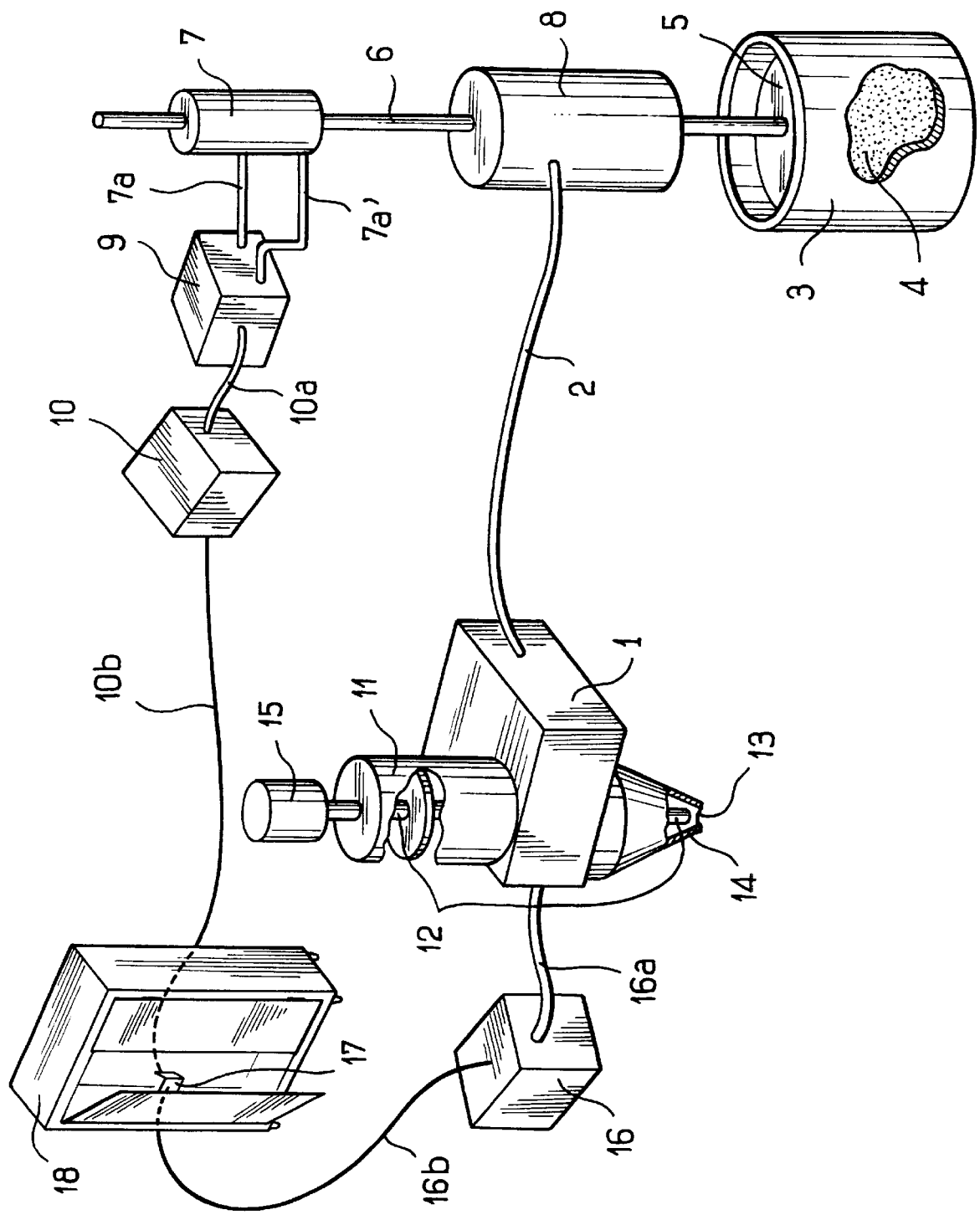

PLANT AND PROCESS FOR THE DISTRIBUTION OF A FLUID PRODUCT, COMPRISING A TANK AND A NOZZLE

BACKGROUND OF THE INVENTION

The present invention concerns the technique of supplying a fluid product such as an extendable foamy, liquid, or gaseous product, by placing the product under adjusted pressure in a nozzle.

The technique for supplying a fluid at an adjusted pressure (see, for example, U.S. Pat. No. 3,873,258) proves especially advantageous with respect to a conventional fluid-spraying procedure, in order to produce foam-based, and thus expandable, objects in a size and at a density which remain constant in one or more directions. In fact, the pressure controls the expansion of the foam, and, therefore, the size of the object produced by extrusion.

The conventional state of the art encompasses two approaches:

1) Installation of a mechanical pressure regulator up-line form the nozzle. This procedure entails the following problems:
   the pressure regulator is bulky and thus difficult to install on a robot;
   it has dead spaces in which the product deteriorates over time and makes the constituent ineffective.
2) Causing the nozzle opening to vary as a function of the pressure inside the nozzle (see U.S. Pat. No. 3,873, 258).

This approach comprises at least one tank from which a feed line extends, and at least one nozzle having means for closing and adjusting the opening of the nozzle, the device having an electrical control box incorporating a conventional electronic card. The electronic system continuously adjusts the opening of the nozzle in order to generate constant pressure, thereby making it possible to produce a constant flow rate, whatever the up-line pressure of the product.

This solution has the disadvantage of being bulky and extremely expensive.

In both cases, precise temperature control is necessary for products whose viscosity varies with temperature.

SUMMARY OF THE INVENTION

The invention is intended to solve these problems, so that, when the nozzle is opened, the pressure corresponds exactly to the pressure giving the proper flow rate, and so that this pressure remains constant.

To this end, in the device according to the invention, the tank is sealed by a plate connected to a pump used to pressurize the fluid continuously fed into the line, said pump being connected to a rod of a jack connected to a control unit equipped with a regulator electrically connected to the electronic card, the nozzle being connected to the regulator by means of a linked sensor connected to said electronic card.

In accordance with other characteristics:
the nozzle is a gun,
the means used to close and adjust the opening of the nozzle is a piston.

To avoid the occurrence of a relatively long response time between the electric signal sent to the pressure regulator and the measurement at the pressure sensor of the nozzle, which may occur as a function of the compressibility of the product and of the elasticity of the fluid conduit, the means for opening and opening adjustment is connected to a speed regulator. The latter controls the opening of the nozzle so that the kinematics thereof are always identical and reproducible. This makes it possible to control circuit adjustment.

Furthermore, the fluid circuit formed by the tank, the pump, the line, and the nozzle is fluid-tight when the nozzle is sealed, and the jack is a hydraulic dual-rod jack.

The invention also concerns a process for the extrusion of a pressurized compressible material, which may be carried out using a device such as tat described above.

The process comprises at least the following steps:
pressurization of the material,
feed of material to the nozzle through the line,
measurement of the pressure of the material in the nozzle,
comparison of the pressure as measured to the pressure value stored in memory in an electronic card,
adjustment of the pressure of the material in the line by the electronic card acting on pressurization means.

According to another feature of the process, the pressure of the material in the nozzle is kept constant.

BRIEF DESCRIPTION OF THE DRAWING

A non-limiting embodiment of the invention will now be described with respect to the single attached drawing, which illustrates diagrammatically a fluid-tight device for extrusion of a foam according to the invention.

DETAILED DESCRIPTION OF THE PREFERRED EMBODIMENT

The device illustrated incorporates an extrusion nozzle 1 connected by means of a line 2 to a tank 3 which holds the foam 4.

The tank 3 is sealed by a sliding plate 5 connected to the rod 6 of a hydraulic dual-rod jack 7. A pump 8 is mounted on said rod 6 as an extension of the tank 3 and of the line 2.

The hydraulic jack 7 is connected by feed tubes 7a, 7a' to a control unit 9 equipped with a proportional pressure regulator 10 fitted with a tube 10a for circulation of the jack pressurization liquid. A jack 11 is mounted on the nozzle 1. The rod 12 of the jack 11 is the nozzle-opening piston. The opening of the nozzle 1 is located at the end of a tapered housing 14 coaxial to the piston 12.

A speed regulator 15 is connected to the jack 11. A pressure sensor 16 equipped with a pressurized foam tube 16a is mounted on the nozzle 1 and is connected electrically, by a cable 16b, to an electronic circuit card 17 housed in an electric control box 18 connected by an electric cable 10b to the pressure regulator 10 of the jack 7.

The device operates in the following way:
The drum-emptying system, which comprises the pump 8, the jack 7, the control unit 9, and the proportional regulator 10 pumps the foam 4 and pressurizes it by the pump 8. The foam 4 reaches the nozzle through the line 2.

When the nozzle 1 is closed, the foam is kept under pressure by means of the pump 8.

The pressure sensor 16 of the nozzle converts the foam pressure as measured in the nozzle 1 into an electric signal.

The electric signal is emitted over the cable 16b to the electronic card 17, which compares it to a reference value and immediately adjusts the oil pressure in the jack 7 by means of the hydraulic control unit 9.

Accordingly, when the nozzle 1 is opened, the pressure is exactly the pressure providing the proper flow rate, and this pressure remains constant, since losses of head are counterbalanced by the hydraulics.

The opening of the nozzle is achieved by the upward motion of the piston 12. The housing 14 is tapered and coaxial to the piston. The greater the upward motion of the piston, the greater the discharge of the foam 4, and thus the flow rate, may be.

The speed regulator 15 controls the opening of the nozzle 1, to ensure that the kinematics thereof are always identical and reproducible. This makes it possible to control the adjustment of the circuit as a function of the compressibility of the foam and of the elasticity of the circuit and counterbalances the potential, relatively long response time between the electric signal transmitted to the pressure regulator 10 and the measurement made at the pressure sensor 16 of the nozzle 1.

This device makes it possible to deposit viscous products at more tan 300 bars of pressure.

I claim:

1. A device for supplying a fluid product such as one of a foamy, liquid, and gaseous product, said device comprising:

a product supply tank (3), a feed line (2) extending from the tank for supplying a discharge nozzle (1), means incorporated in the nozzle for closing and adjusting an opening of said nozzle (1), and an electrical control box (18) having an electronic circuit card (17) mounted therein, wherein the tank is sealed by a sliding plate (5) connected to a pump (8) which pressurizes the fluid product fed continuously into the feed line, and the pump is connected to a rod (6) of a fluid jack (7) in turn connected to a control unit (9) having a regulator (10) connected electrically to the electronic circuit card (17), the nozzle (1) being linked to the regulator by a pressure sensor (16) coupled to the nozzle and also connected to said electronic circuit card, such that the jack is regulated in accordance with the sensed fluid pressure in the nozzle.

2. A device according to claim 1, wherein the nozzle is a gun.

3. A device according to claim 1, therein the means for closing and adjusting the opening of the nozzle is a piston (12).

4. A device according to claim 3, wherein the means for closing and adjusting is connected to a speed regulator (15).

5. A device according to claim 1, wherein a fluid circuit formed by the tank (3), the pump (8), the line (2) and the nozzle is fluid-tight when the nozzle (1) is closed.

6. A device according to claim 1, wherein the jack is a dual-rod hydraulic jack.

7. A process for extruding a compressible material (4) under pressure, said process comprising the following steps:

a) pressurizing the material (4), b) feeding the material to a nozzle (1) via a line (2), c) measuring the pressure of the material in the nozzle, d) comparing the pressure as measured to a reference pressure value stored in memory in an electronic circuit card (17), and e) adjusting the pressure of the material in the line by controlling the pressurizing of the material in accordance with the result of the pressure comparison.

8. A process according to claim 7, wherein the pressure of the materials in the nozzle is kept constant.

* * * * *